US008933887B2

(12) United States Patent
Umemoto et al.

(10) Patent No.: US 8,933,887 B2
(45) Date of Patent: Jan. 13, 2015

(54) DEVICE INFORMATION DISPLAY APPARATUS AND DEVICE INFORMATION DISPLAY METHOD

(75) Inventors: Mako Umemoto, Tokyo (JP); Kazuhiro Hashizumi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 549 days.

(21) Appl. No.: 13/216,670

(22) Filed: Aug. 24, 2011

(65) Prior Publication Data

US 2012/0050156 A1    Mar. 1, 2012

(30) Foreign Application Priority Data

Aug. 25, 2010 (JP) .................................. 2010-188325

(51) Int. Cl.
 *G06F 3/048* (2013.01)
 *G05B 19/042* (2006.01)
(52) U.S. Cl.
 CPC .. *G05B 19/0428* (2013.01); *G05B 2219/23128* (2013.01); *G05B 2219/23178* (2013.01); *G05B 2219/24098* (2013.01)
 USPC .......................................... 345/167; 715/785
(58) Field of Classification Search
 CPC ....... G06F 3/02; G06F 3/0362; G06F 3/0487; G06F 3/0485; G09G 5/34; G09G 5/343; G05B 19/0428; G05B 2219/23128; G05B 19/00–19/058; H01H 19/001; G01D 7/02–7/10
 USPC ........... 345/156–184; 715/784–787, 830–831
 See application file for complete search history.

(56) References Cited

U.S. PATENT DOCUMENTS 2,731,966 A * 1/1956 Neilsen ........................... 40/379
4,561,049 A * 12/1985 Deleganes et al. ................ 700/1
5,754,778 A * 5/1998 Shoujima ...................... 709/206
(Continued)

FOREIGN PATENT DOCUMENTS

DE    202007006210 U1    7/2007
DE    202007006210 U1    8/2007
(Continued)

OTHER PUBLICATIONS

English Translation (by machine) of Japanese Patent Application Publication JP 2010-133809 A, Suzuki et al., Jun. 17, 2010.*
European Search Report corresponding to European Patent Application No. 11178381.7, dated Jan. 13, 2012.

*Primary Examiner* — Liliana Cerullo
(74) *Attorney, Agent, or Firm* — Sughrue Mion, PLLC

(57) ABSTRACT

A device information display apparatus may include a device information reception unit that acquires device information of a device through a field bus, the device being connected to the field bus, a display unit that displays the device information, which has been acquired by the device information reception unit, on a screen, a display switch unit that switches the devices of which the display unit displays the device information, switching of the devices being performed according to a predetermined order, and a manipulation unit that receives a manipulation instructing the switching of the devices by the display switch unit, the manipulation unit outputting an instruction signal. The display switch unit may receive the instruction signal and switches the devices in one of a forward direction and a reverse direction of the predetermined order based on a direction of the manipulation, which has been received by the manipulation unit.

14 Claims, 7 Drawing Sheets

(56) References Cited

U.S. PATENT DOCUMENTS

| | | | |
|---|---|---|---|
| 5,973,669 A | 10/1999 | Fitzmaurice et al. | |
| 6,023,399 A * | 2/2000 | Kogure | 361/23 |
| 2003/0128192 A1 | 7/2003 | Van Os | |
| 2007/0200826 A1* | 8/2007 | Zeng et al. | 345/166 |
| 2007/0296711 A1* | 12/2007 | Yee et al. | 345/184 |
| 2010/0174388 A1* | 7/2010 | Ferreira et al. | 700/83 |

FOREIGN PATENT DOCUMENTS

| | | |
|---|---|---|
| EP | 1772881 A1 | 4/2007 |
| JP | 2002-008176 A | 1/2002 |
| JP | 2002-259009 A | 9/2002 |
| JP | 2004-157661 A | 6/2004 |
| JP | 2010-133809 A | 6/2010 |

* cited by examiner

DEVICE INFORMATION DISPLAY APPARATUS AND DEVICE INFORMATION DISPLAY METHOD

BACKGROUND OF THE INVENTION

1. Field of the Invention

The present invention relates to a device information display apparatus and a device information display method. Specifically, the present invention relates to a device information display apparatus and a device information display method that can display device information of a desired device by an easy manipulation.

Priority is claimed on Japanese Patent Application No. 2010-188325, filed Aug. 25, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A system in which a host device and a field device are connected to each other via a field bus that is a digital signal transmission line is known as a distributed field control system used, for example, in a plant.

A display device is connected to the field bus of such a distributed control system. This display device acquires and displays device information such as a flow value, a temperature, a static pressure value, etc. transmitted from each field device. Accordingly, a worker or a device manager can confirm the device information.

In a conventional display device, a desired field device may be selected by a button included in the device or a display screen may be switched by manipulation according to a prescribed button manipulation procedure or a button manipulation instruction displayed during a manipulation. Also, Japanese Unexamined Patent Application, First Publication No. 2010-133809 discloses a device information display apparatus in which a transition time interval for a plurality of display information is changed to facilitate a task for a worker to confirm display information.

However, in a conventional display device, a button manipulation is complex and a worker is not allowed to confirm information of a desired field device immediately at a desired timing. Further, since the number of characters that can be displayed on the display device is limited, digits of a displayed numerical value are limited.

SUMMARY

A device information display apparatus may include a device information reception unit that acquires device information of a device through a field bus, the device being connected to the field bus, a display unit that displays the device information, which has been acquired by the device information reception unit, on a screen, a display switch unit that switches the devices of which the display unit displays the device information, switching of the devices being performed according to a predetermined order, and a manipulation unit that receives a manipulation instructing the switching of the devices by the display switch unit, the manipulation unit outputting an instruction signal. The display switch unit may receive the instruction signal and switches the devices in one of a forward direction and a reverse direction of the predetermined order based on a direction of the manipulation, which has been received by the manipulation unit.

If a speed of the manipulation, which has been received by the manipulation unit, is slower than a predetermined value, then the display switch unit may switch a displayed device to a next device. If the speed of the manipulation, which has been received by the manipulation unit, is faster than or equal to the predetermined value, then the display unit may switch the displayed device continuously to following devices.

If the manipulation unit receives the manipulation that is a reverse direction of a current manipulation while the display switch unit switches the device continuously, then the display switch unit may stop a switching operation of the device.

The manipulation unit may include a scroll knob that is rotatable to be manipulated. The manipulation, which the manipulation unit receives, may be an operation of rotating the scroll knob.

The display unit may display graphically an order of the devices of which the device information is to be displayed.

The predetermined order may be defined to cause a number showing the order to correspond to each device by a computer including a configuration tool.

The display unit may be arranged at a front of the device information display apparatus, and a scroll knob may be included on a right surface of the device information display apparatus.

A device information display apparatus may include field devices that are connected to a field bus, a device information reception unit that is connected to the field bus, the device information reception unit acquiring device information of the field devices through the field bus, a display unit that displays the device information, which has been acquired by the device information reception unit, on a screen, a display switch unit that switches the field devices of which the display unit displays the device information, switching of the field devices being performed according to a predetermined order, and a manipulation unit that receives a manipulation instructing the switching of the field devices by the display switch unit, the manipulation unit outputting an instruction signal. The display switch unit may receive the instruction signal and switches the field devices in one of a forward direction and a reverse direction of the predetermined order based on a direction of the manipulation, which has been received by the manipulation unit.

If a speed of the manipulation, which has been received by the manipulation unit, is slower than a predetermined value, then the display switch unit may switch a displayed field device to a next field device. If the speed of the manipulation, which has been received by the manipulation unit, is faster than or equal to the predetermined value, then the display unit may switch the displayed field device continuously to following field devices.

If the manipulation unit receives the manipulation that is a reverse direction of a current manipulation while the display switch unit switches the field device continuously, then the display switch unit may stop a switching operation of the field device.

The manipulation unit may include a scroll knob that is rotatable to be manipulated. The manipulation, which the manipulation unit receives, may be an operation of rotating the scroll knob.

The display unit may display graphically an order of the field devices of which the device information is to be displayed.

The predetermined order may be defined to cause a number showing the order to correspond to each field device by a computer including a configuration tool.

The display unit maybe arranged at a front of the device information display apparatus, and a scroll knob may be included on a right surface of the device information display apparatus.

A device information display method may include acquiring device information of a device through a field bus, the device being connected to the field bus, displaying the device information, which has been acquired, on a screen, switching the devices of which the device information is displayed, switching of the devices being performed according to a predetermined order, and receiving a manipulation instructing the switching of the devices, the manipulation unit outputting an instruction signal. Switching of the devices may be performed in one of a forward direction and a reverse direction of the predetermined order based on a direction of the manipulation, which has been received.

If a speed of the manipulation, which has been received, is slower than a predetermined value, then a displayed device may be switched to a next device. If the speed of the manipulation, which has been received, is faster than or equal to the predetermined value, then the displayed device may be switched continuously to following devices.

If the manipulation is in a reverse direction of a current manipulation while the device is switched continuously, then a switching operation of the device may be stopped.

The manipulation may be an operation of rotating a scroll knob.

An order of the devices of which the device information is to be displayed may be displayed graphically.

The predetermined order may be defined to cause a number showing the order to correspond to each device by a computer including a configuration tool.

In the device information display apparatus in accordance with the first preferred embodiment of the present invention, devices are switched in the forward direction or the reverse direction of the predetermined order based on the manipulation direction received by the manipulation unit. Thereby, device information can be displayed with an easy manipulation.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated herein for explanatory purposes.

Figure 1:
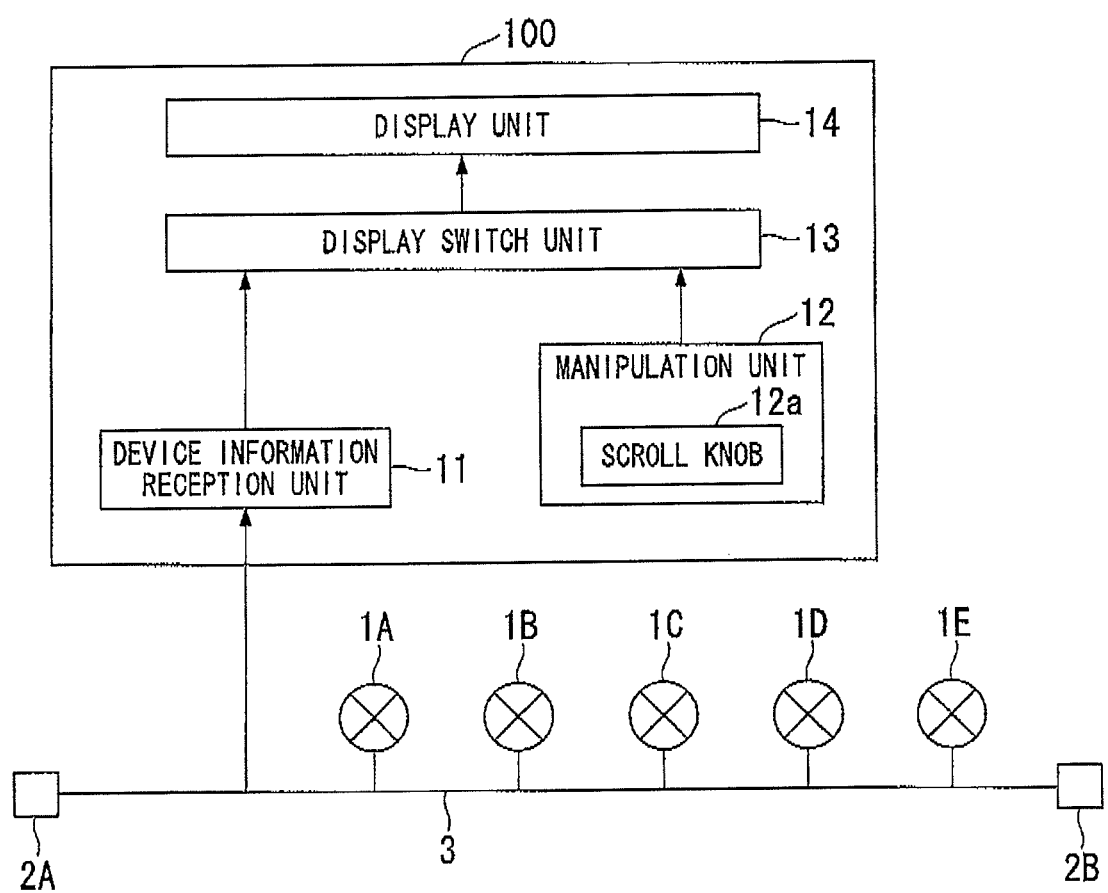
FIG. 1 is a block diagram illustrating an example of a configuration of a distributed field control system using a device information display apparatus in accordance with a first preferred embodiment of the present invention.

FIG. 1 is a block diagram illustrating an example of a configuration of a distributed field control system using a device information display apparatus in accordance with a first preferred embodiment of the present invention.

As shown in FIG. 1, field devices 1A, 1B, 1C, 1D, and 1E, which are hereinafter referred to as "field devices 1A to 1E", are arranged in a plant. The field devices 1A to 1E are connected with a device information display apparatus 100 via a field bus 3. Terminators 2A and 2B are connected to both ends of the field bus 3. Each of the field devices 1A to 1E may be, for example, a differential pressure transmitter, a flowmeter, a temperature transmitter, etc.

The device information display apparatus 100 acquires process values such as a differential pressure value, a flow value and a temperature, and a plurality of device information such as status information, which is acquired by the respective field devices 1A to 1E, generates display information containing tag information, and displays the display information on a display screen of a display unit.

As shown in FIG. 1, the device information display apparatus 100 includes a device information acquisition unit 11, a manipulation unit 12 including a scroll knob 12a that is a rotatable manipulation member, a display switching unit 13, and a display unit 14.

The device information acquisition unit 11 is connected to the field devices 1A to 1E via the field bus 3. The device information acquisition unit 11 converts device information acquired by each of the field devices 1A to 1E into "information capable of being displayed on the display unit 14" and transmits the information capable of being displayed on the display unit 14 to the display switching unit 13.

The manipulation unit 12 transmits an instruction signal to the display switching unit 13. The display switching unit 13 selects device information to be displayed on the display unit 14 from among a plurality of device information received from the device information acquisition unit 11 according to the instruction signal received from the manipulation unit 12, and transmits the selected device information to the display unit 14. The display unit 14 displays the device information received from the display switching unit 13.

In the device information display apparatus 100 of the present embodiment, devices for which the device information is displayed by the display unit 14 are switched according to a prescribed order. This order is defined to cause the number, which shows the order, to correspond to each of the field devices 1A to 1E by a computer, which is not illustrated in the figure, including a configuration tool. The device information display apparatus 100 acquires the number corresponding to each of the field devices 1A to 1E from the computer to recognize the order.

Thus, in response to the instruction signal output by the manipulation unit 12, the device information display apparatus 100 sequentially selects the device information according to the order and displays the device information on the display unit 14.

Figure 2:
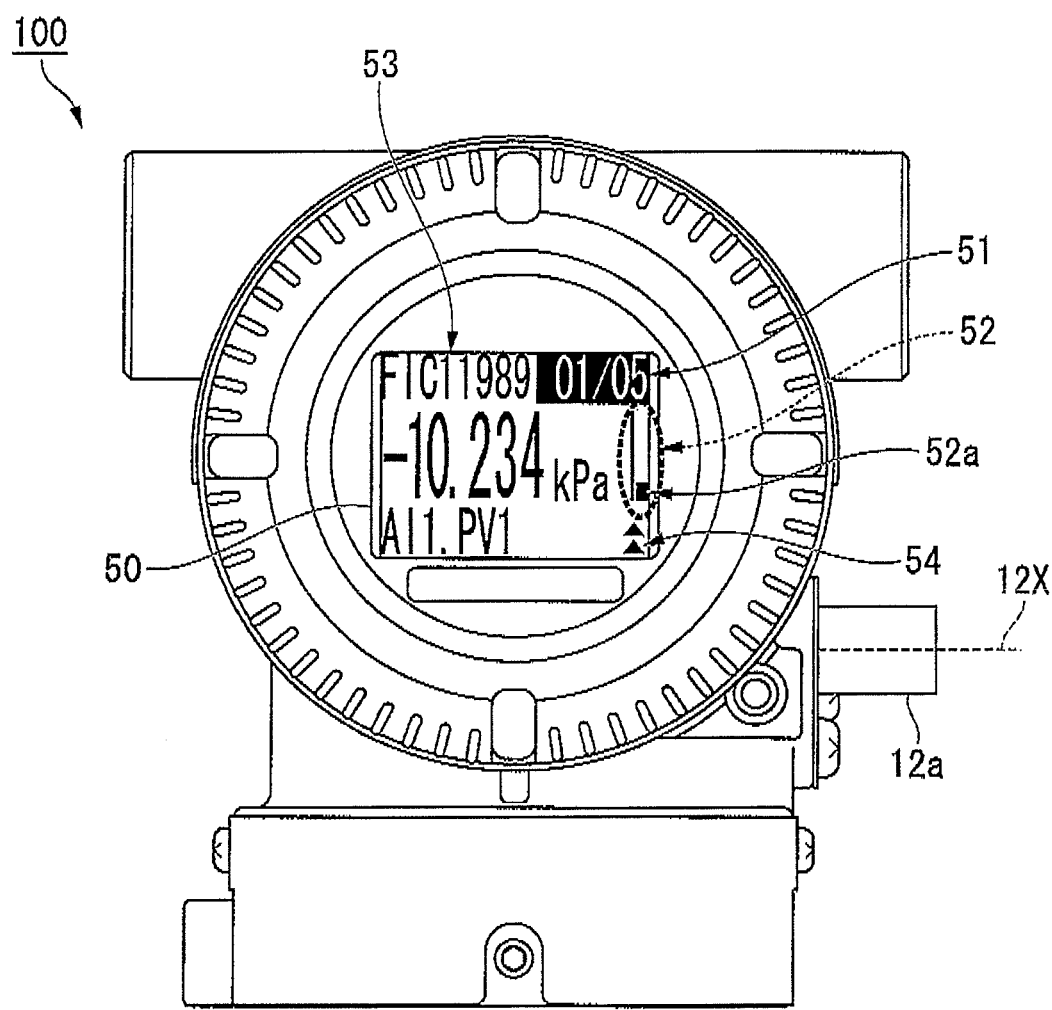
FIG. 2 is a front view illustrating an appearance of one example of the device information display apparatus in accordance with the first preferred embodiment of the present invention.

FIG. 2 is a front view illustrating an appearance of one example of the device information display apparatus 100 in accordance with the first preferred embodiment of the present invention.

In FIG. 2, a display screen 50 of the display unit 14 configured of, for example, a liquid crystal display device, is arranged at a front of the device information display apparatus 100. In FIG. 2, a scroll knob 12a is included on a right surface of the device information display apparatus 100.

The scroll knob 12a can be rotated clockwise or counterclockwise around a shaft 12x extending laterally in FIG. 2, when viewed from the right. Accordingly, a worker confirming the display screen 50 can manipulate the scroll knob 12a with his or her right hand. According to a manipulation by the worker, an instruction signal depending on a rotation speed and direction of the scroll knob 12a is transmitted to the display switching unit 13.

A process value such as a sensor value or a manipulation value, which is in the example of FIG. 2, the pressure value as the sensor value, is displayed, as the device information of the currently displayed device, on the display screen 50.

Further, an order of a currently displayed device is graphically displayed on the display screen 50. In the example shown in FIG. 2, "01/05" is displayed in an area 51 of the display screen 50. It can be seen that the device information is information of a first device among five connected devices. Further, a scroll bar visually indicating the order of the currently displayed device using a position of a mark 52a is displayed in an area 52 of the display screen 50. Further, a tag name of the currently displayed device is displayed in an area 53 of the display screen 50.

Further, a "display state mark" indicating a current display state is displayed in an area 54 of the display screen 50. Specifically, when one item of device information is switched in a forward order with respect to the above order and displayed, one mark "▲" is displayed. When one item of device information is switched in a reverse order with respect to the order and displayed, one mark "▼" is displayed. Further, in a forward order scan mode, two marks "▲" are displayed, and in a reverse order scan mode, two marks "▼" are displayed. A display switching method and content of the scan mode will be described later.

Further, a character scroll function may be provided as a method of displaying device information such as process data on the display screen 50. For example, if the set character number of the tag information exceeds digits that can be displayed, a character string is scrolled in a left direction in FIG. 2 in the display screen 50 and displayed, such that the character string exceeding the digits that can be displayed can also be confirmed. In this case, the character string is scrolled at an appropriate speed by one pitch of a pixel of the display screen 50, such that a long character string can be displayed without degrading legibility. Further, the character string may be scrolled by a plurality of pitches or in units of characters.

Figure 3:
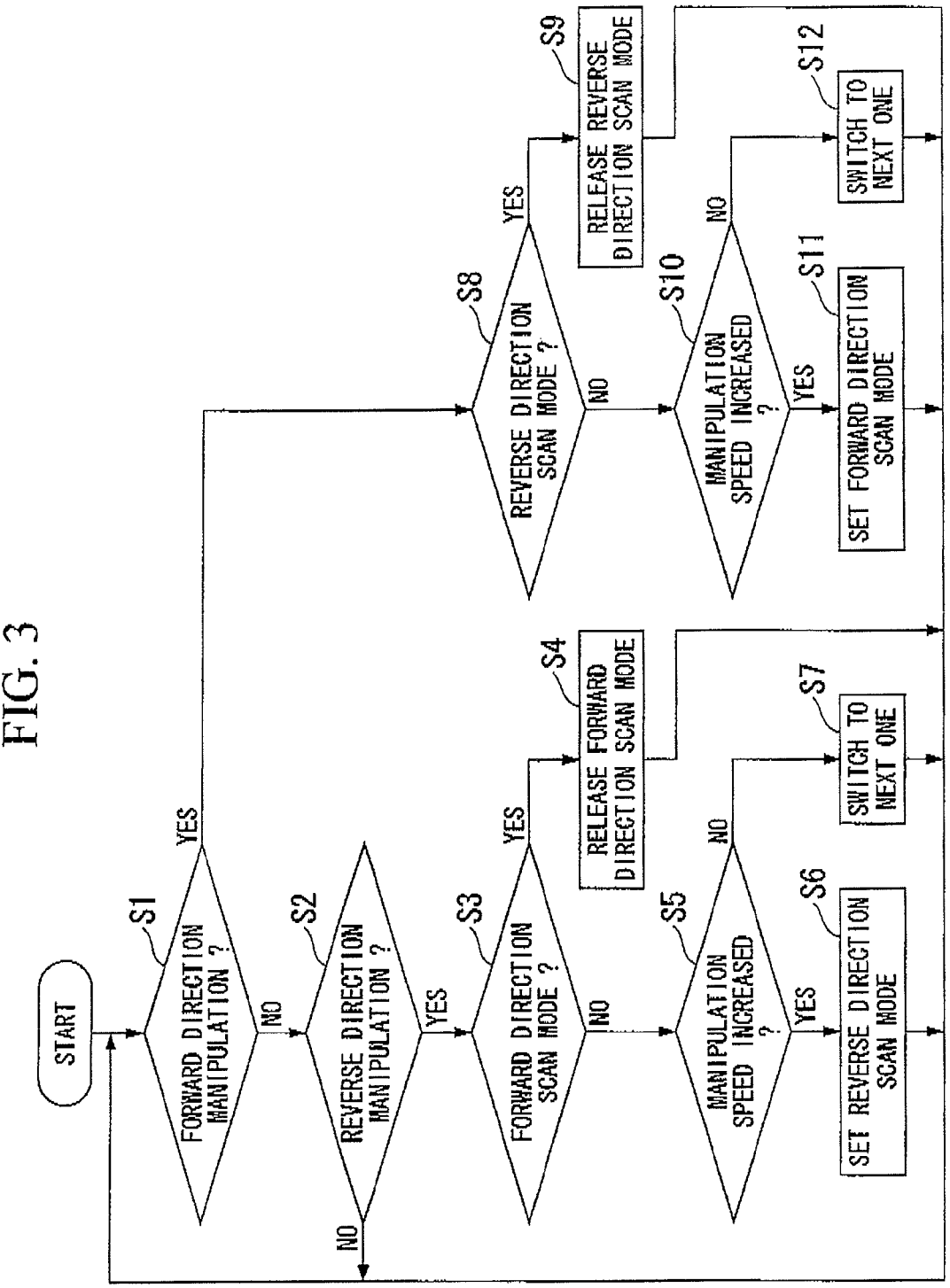
FIGS. 3 and 4 are flowcharts illustrating operations of the device information display apparatus in accordance with the first preferred embodiment of the present invention.
Figure 4:
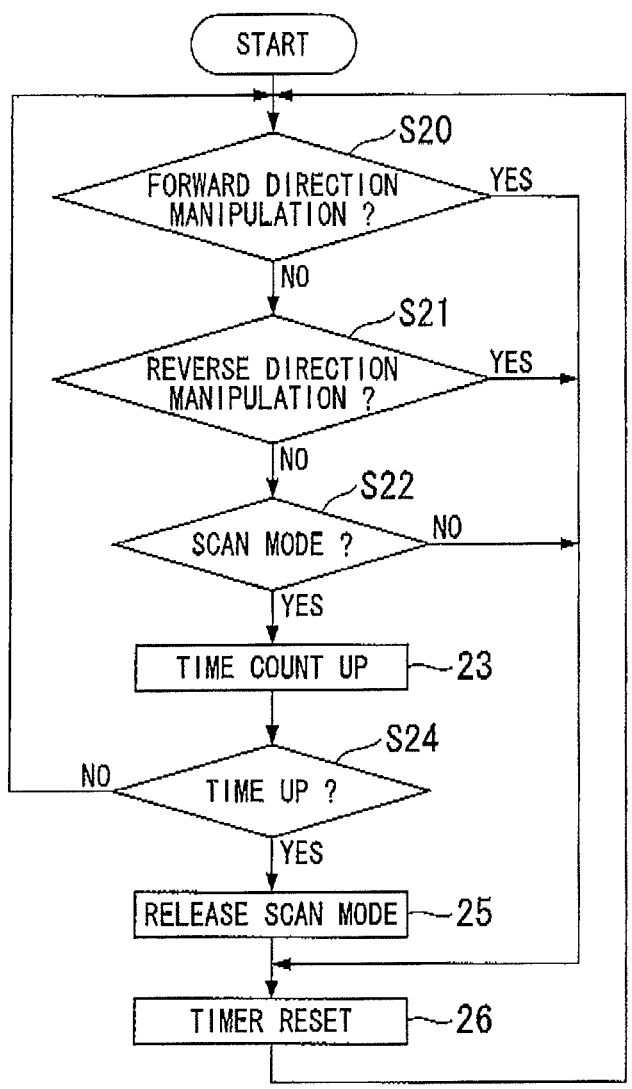

FIGS. 3 and 4 are flowcharts illustrating operations of the device information display apparatus 100 in accordance with the first preferred embodiment of the present invention.

First, the operation of the device information display apparatus 100 will be described with reference to FIG. 3.

In step S1, the manipulation unit 12 judges whether a forward order manipulation for the scroll knob 12a is performed. If it is judged in step S1 that the forward order manipulation is not performed (step S1: NO), the process proceeds to step S2. In step S2, the manipulation unit 12 judges whether a reverse order manipulation for the scroll knob 12a is performed.

If it is judged in step S2 that the reverse order manipulation is not performed (step S2: NO), the process proceeds to step S1. If it is judged in step S2 that the reverse order manipulation is performed (step S2: YES), the process proceeds to step S3. In step S3, a judgment is made as to whether currently displayed devices are continuously switched in a forward order direction that is a forward order scan mode.

If it is judged in step S3 that a mode currently is not the forward order scan mode (step S3: NO), the process proceeds to step S5. If the mode currently is the forward order scan mode (step S3: YES), the process proceeds to step S4. In step S4, the manipulation unit 12 instructs the display switching unit 13 to release the forward order scan mode, the display switching unit 13 releases the forward order scan mode, and the process returns to step S1. "Release the forward order scan mode," specifically, is to stop continuously switching displayed devices.

In step S5, a judgment is made as to whether a manipulation speed is high. If the manipulation speed is equal to or more than a given value, it is judged that the manipulation speed is high (step S5: YES), and the process proceeds to step S6. In step S6, the manipulation unit 12 instructs the display switching unit 13 to set the reverse order scan mode, the display switching unit 13 sets the reverse order scan mode, and the process returns to step S1. The manipulation speed equal to or more than the given value refers to, for example, 1 half rotation (180°) per second, i.e., manipulation speed≥(half rotation/sec).

When the manipulation speed is less than the given value (step S5: NO), the process proceeds to step S7. In step S7, the manipulation unit 12 instructs the display switching unit 13 to switch one display in a reverse order, and the process returns to step S1. The manipulation speed less than the given value refers to, for example, manipulation speed less than 1 half rotation per second, i.e., manipulation speed<(half rotation/sec).

In step S1, if the forward order manipulation for the scroll knob 12a is performed (step S1: YES), the process proceeds to step S8. In step S8, a judgment is made as to whether the currently displayed devices are continuously switched in the reverse order direction that is a reverse order scan mode.

If it is judged in step S8 that the mode currently is not the reverse order scan mode (step S8: NO), the process proceeds to step S10. If the mode currently is the reverse order scan mode (step S8: YES), the process proceeds to step S9. In step S9, the manipulation unit 12 instructs the display switching unit 13 to release the reverse order scan mode, the display switching unit 13 releases the reverse order scan mode, and the process returns to step S1.

In step S10, a judgment is made as to whether the manipulation speed is high. If the manipulation speed is equal to or more than a given value, it is judged that the manipulation speed is high (step S10: YES), and the process proceeds to step S11. In step S11, the manipulation unit 12 instructs the display switching unit 13 to set the forward order scan mode, the display switching unit 13 sets the forward order scan mode, and the process returns to step S1.

If the manipulation speed is less than the given value (step S10: NO), the process proceeds to step S12. In step S12, the manipulation unit 12 instructs the display switching unit 13 to switch one display in the forward order, and the process returns to step S1.

Next, the operation of the device information display apparatus 100 will be described with reference to FIG. 4. FIG. 4 shows a process of releasing the scan mode at a given time. In the device information display apparatus 100, the process is executed with the above-described operation in FIG. 3.

In step S20, the manipulation unit 12 judges whether a forward order manipulation for the scroll knob 12a is performed. If it is judged in step S20 that the forward order manipulation is performed (step S20: YES), the process proceeds to step S26.

If the forward order manipulation for the scroll knob 12a is not performed (step S20: NO), the process proceeds to step S21. In step S21, the manipulation unit 12 judges whether a reverse order manipulation for the scroll knob 12a is performed. If it is judged in step S21 that the reverse order manipulation is performed (step S21: YES), the process proceeds to step S26.

If the reverse order manipulation for the scroll knob 12a is not performed (step S21: NO), the process proceeds to step S22. In step S22, a judgment is made as to whether the mode currently is the forward order scan mode or the reverse order scan mode. If it is judged in step S22 that the mode is not the scan mode (step S22: NO), the process proceeds to step S26.

If the mode currently is the scan mode (step S22: YES), the process proceeds to step S23. In step S23, a device-embedded timer, which is not illustrated in the figure, counts up and the process proceeds to step S24.

In step S24, a judgment is made as to whether the device-embedded timer has exceeded a given time or timed up. If the device-embedded timer does not exceed the given time (step S24: NO), the process returns to step S20. If the device-embedded timer exceeds the given time (step S24: YES), the process proceeds to step S25. In step S25, the manipulation unit 12 instructs the display switching unit 13 to release the scan mode, the display switching unit 13 releases the scan mode, and the process proceeds to step S26.

In step S26, the device-embedded timer is reset and the process returns to step S20.

Figure 5A:
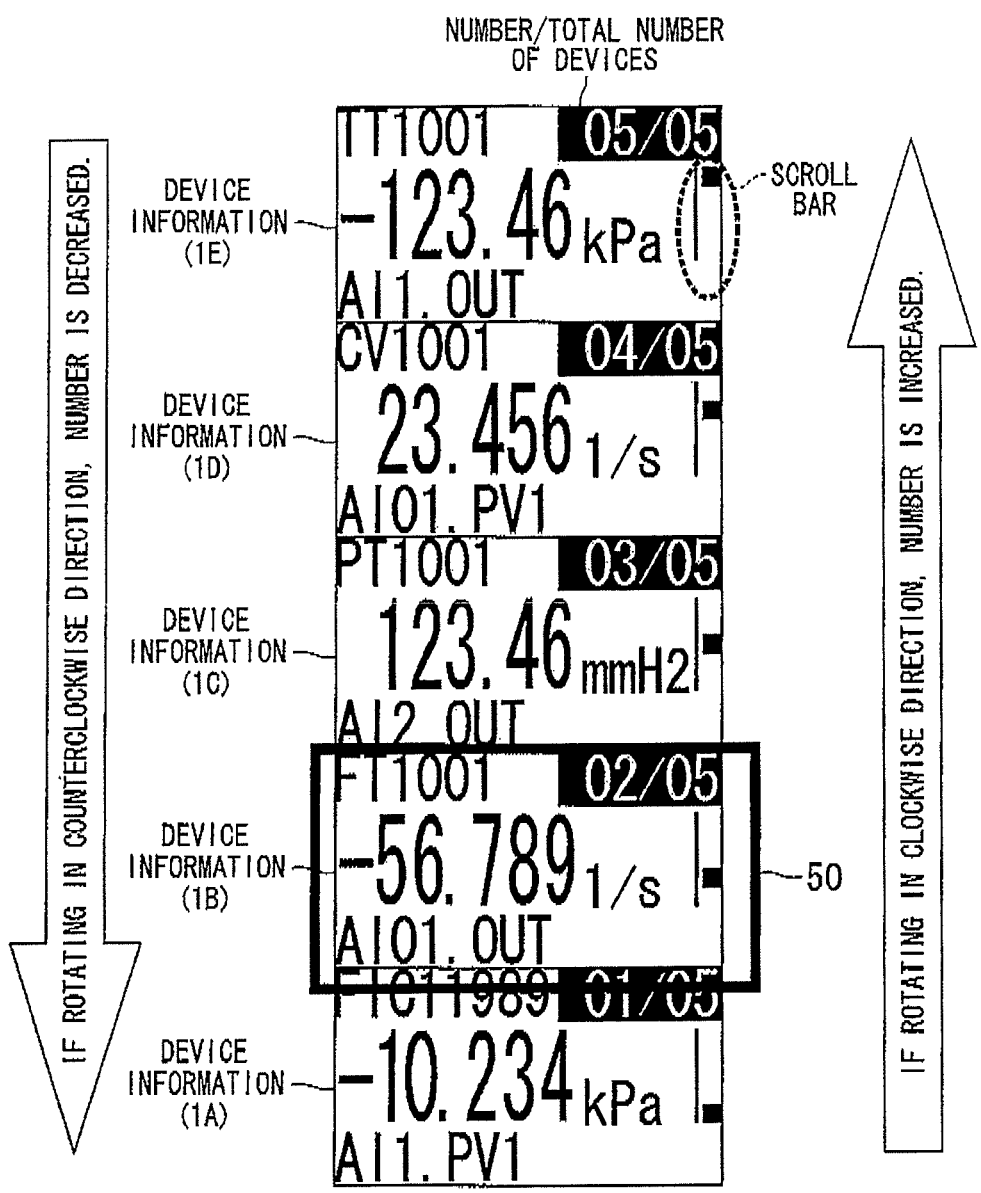
FIGS. 5A and 5B are diagrams illustrating the order of the device information displayed on a display screen in accordance with the first preferred embodiment of the present invention.
Figure 5B:
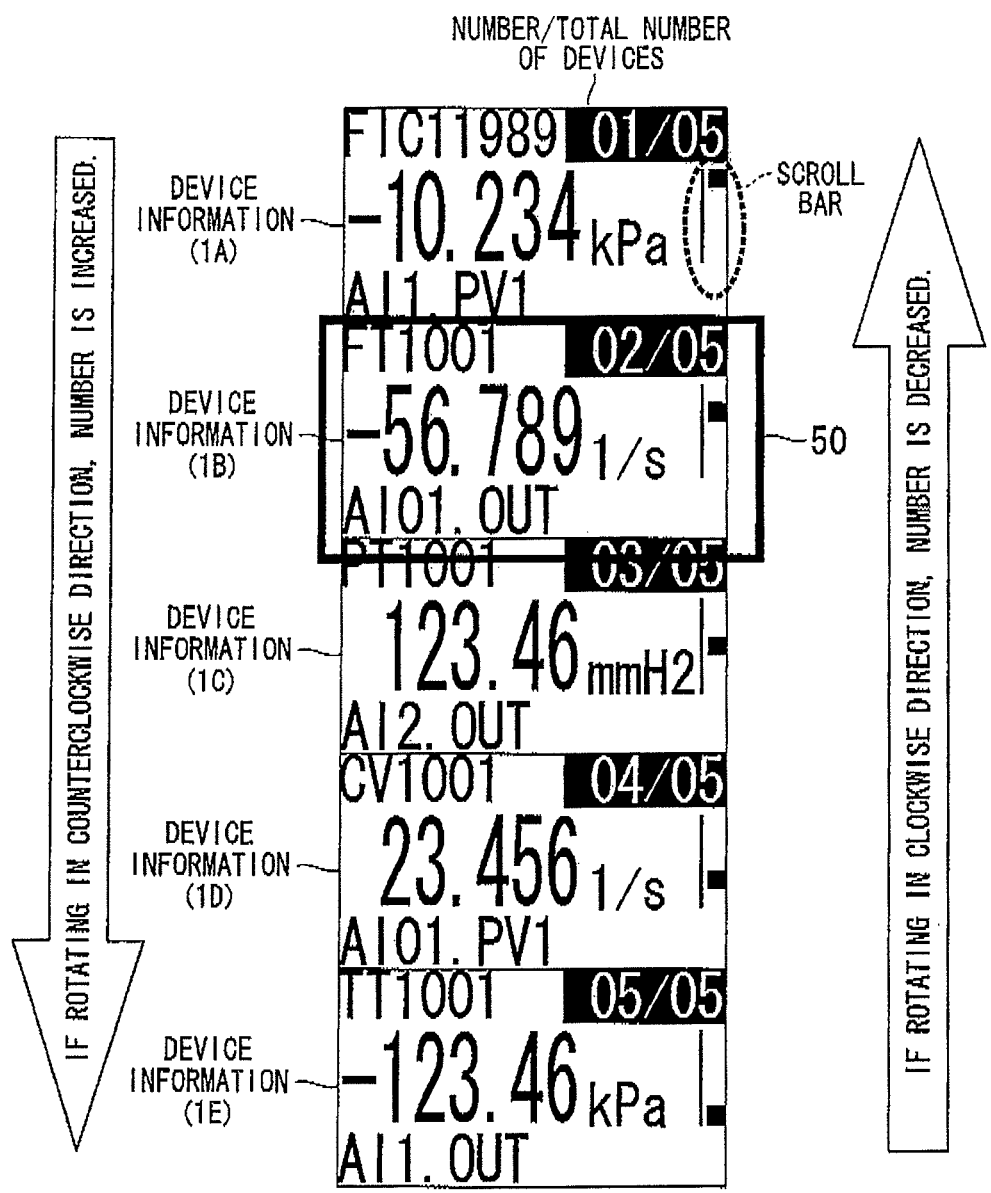

FIGS. 5A and 5B are diagrams illustrating the order of the device information displayed on the display screen 50 in accordance with the first preferred embodiment of the present invention.

FIG. 5A shows a case in which a number-increasing direction is a forward order when the scroll knob 12a is manipulated to be rotated clockwise, in which a chronological display order is indicated by an arrow.

In FIG. 5A, as the above number determining the display order, "1" is assigned to the field device 1A, "2" to the field device 1B, "3" to the field device 1C, "4" to the field device 1D, and "5" to the field device 1E, in advance. If the scroll knob 12a is rotated clockwise, the device information is displayed in a forward order of the field devices 1A→1B→1C→1D→1E→1A→1B→ . . . . Reversely, if the scroll knob 12a is rotated counterclockwise, the device information is displayed in a reverse order of the field devices 1E→4D→1C→1B→1A→1E→1D→ . . . . As shown as a procedure of steps S1 to S12, when the scroll knob 12a is slowly rotated, the displayed devices are switched one by one. When the scroll knob 12a is rotated quickly, the mode enters the scan mode, and the displayed devices are continuously switched. In this case, the scan mode is released by reversing the scroll knob 12a or by not manipulating the scroll knob 12a during a certain time.

FIG. 5B shows an example in which a number-decreasing direction is a forward order when the scroll knob 12a is manipulated to be rotated clockwise. If the scroll knob 12a is rotated clockwise, the device information is displayed in order of decreasing the order prescribed for the field devices 1A to 1E.

In this case, if the scroll knob 12a is rotated clockwise, the device information is displayed in a forward order of the field devices 1E→1D→1C→1B→1A→1E→1D→ . . . . Reversely, if the scroll knob 12a is rotated counterclockwise, the device information is displayed in a reverse order of the field devices 1A→1B→1C→1D→1E→1A→1B→ . . . . Even in this case, when the scroll knob 12a is slowly rotated, the displayed devices are switched one by one. When the scroll knob 12a is rotated quickly, the mode enters the scan mode, and the displayed devices are continuously switched. In this case, the scan mode is released by reversing the scroll knob 12a or by not manipulating the scroll knob 12a during a certain time.

Figure 6:
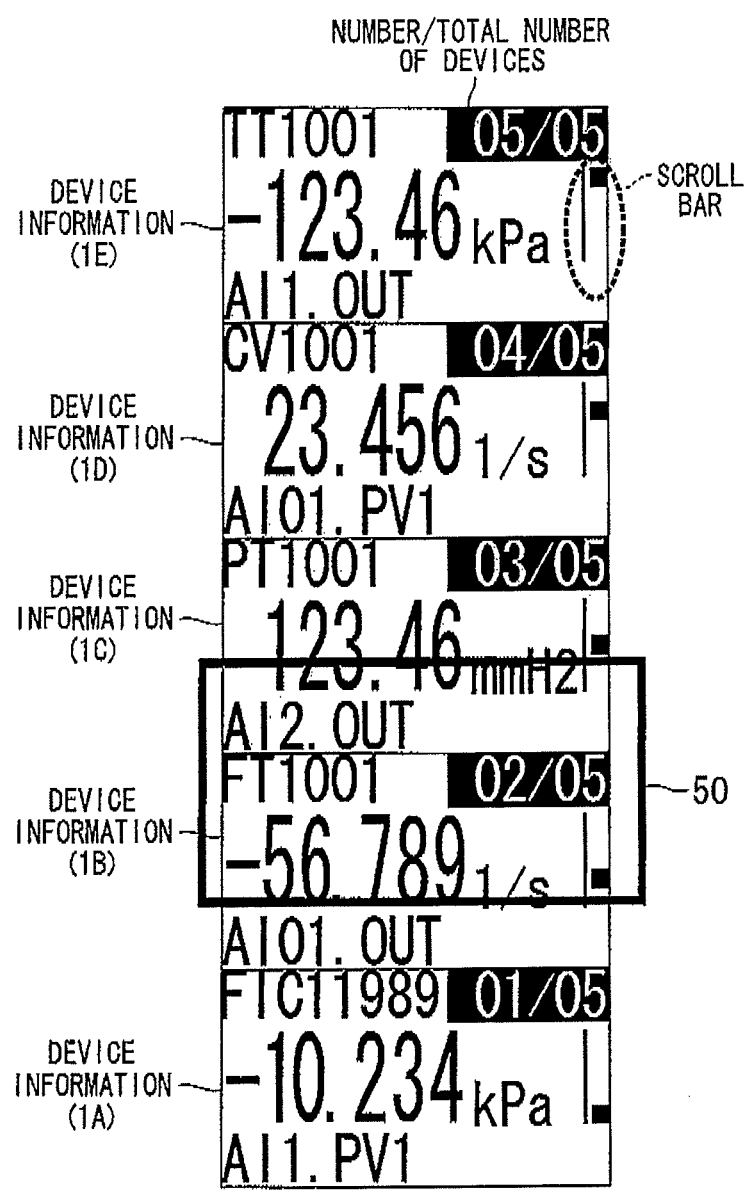
FIG. 6 is a diagram illustrating a display example when a device information display object is switched through a scroll display in accordance with the first preferred embodiment of the present invention.

When the device information is switched, the entire display screen 50 may be simultaneously switched or the screen may be switched while scrolling the display of the display screen 50 vertically in FIG. 2. In the latter case, the display may be scrolled at an appropriate speed by one pitch of the pixel of the display screen 50 in FIG. 2 and displayed to transition to an image that is a still image of a next device, such that a switching situation of the display screen 50 can be easily recognized. FIG. 6 is a diagram illustrating a display example when a device information display object is switched through scroll display. As shown as the display screen 50 in FIG. 6, in this case, the display screen 50 during display switching transitions to a still image, which is the display screen 50 as shown in FIG. 2, across two still images.

Setting the number order as the forward order, which is the number-increasing order, to display the device information when the scroll knob 12a is rotated clockwise as setting the number-decreasing order as the reverse order to display the device information when the scroll knob 12a is rotated counterclockwise or setting the number order as the forward order, which is the number-increasing order, to display the device information when the scroll knob 12a is rotated counterclockwise as setting the number-decreasing order as the reverse order to display the device information when the scroll knob 12a is rotated clockwise may be freely performed in the device information display apparatus 100 by a worker using a configuration tool.

As described above, the device information display apparatus 100 in accordance with the first preferred embodiment of the present invention includes the device information acquisition unit 11 that acquires the device information of devices connected to the field bus, the display unit 14 that displays the device information acquired by the device information acquisition unit 11 on a screen, the display switching unit 13 that switches the device whose information is displayed by the display unit 14, according to a prescribed order, and the manipulation unit 12 that receives a manipulation to instruct the display switching unit 13 to perform a switching operation. The display switching unit 13 is configured to switch the devices in the forward order or the reverse order according to a manipulation direction of the manipulation unit 12. Because of this, in the device information display apparatus 100, desired device information can be rapidly displayed by a simple manipulation for the manipulation unit 12 while maintaining properties of portability such as a small size and a light weight.

In the first preferred embodiment of the present invention, the scroll knob 12a is applied to the manipulation unit 12. When a manipulation speed of the scroll knob 12a is less than a given value, only one device is switched as the steps S7 and S12. When the manipulation speed is equal to or more than the given value, the devices are continuously switched after the manipulation as the steps S6 and S11. Because of this, displayed devices can be switched one by one or displayed in the scan mode by a simple manipulation.

Further, when the devices are continuously switched, if the scroll knob 12a is manipulated in a reverse direction of the current manipulation, the device switching operation stops as the steps S4 and S9. Accordingly, the scan mode can be released by the simple manipulation.

While, in the present embodiment, the scroll knob 12a is applied to the manipulation unit 12, a non-contact switch such as a magnet switch or an infrared switch, or another switch such as a dial switch may be applied.

In the case of the magnet switch, for example, several magnets are embedded in the device information display apparatus 100, and another magnet is moved from the exterior of the device information display apparatus 100 to generate a magnetic field. The manipulation unit 12 determines whether to set the scan mode or set the forward order or the reverse order based on magnetic field information such as a size or a direction of the generated magnetic field, and transmits an instruction to the display switching unit 13.

In the case of the infrared switch, for example, an infrared sensor is included in the display screen of the device information display apparatus 100. Infrared light is focused on the display screen and moved, so that the infrared sensor detects a motion of the infrared light. The manipulation unit 12 determines whether to set the scan mode or set the forward order or the reverse order based on infrared information such as a motion direction or speed of the infrared light detected by the infrared sensor, and transmits an instruction to the display switching unit 13.

The present invention may be widely applied, for example, to a device information display apparatus that displays the device information acquired via the field bus.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified terra if this deviation would not negate the meaning of the word it modifies.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device information display apparatus comprising:
   a device information reception unit that acquires device information of devices through a field bus, the devices being connected to the field bus;
   a display unit that displays the device information, which has been acquired by the device information reception unit, on a screen;
   a display switch unit that switches the devices of which the display unit displays the device information, switching of the devices being performed according to a predetermined order; and
   a manipulation unit that comprises a scroll knob that is rotatable to be manipulated, the manipulation unit transmitting an instruction signal depending on a rotation speed and rotation direction of the scroll knob to the display switch unit,
   wherein the display switch unit receives the instruction signal and switches the devices in one of a forward direction and a reverse direction of the predetermined order based on the rotation direction of the scroll knob, which has been received by the manipulation unit, and wherein
   when the rotation speed of the scroll knob, which has been received by the display switch unit, is slower than a predetermined value, the display switch unit switches a displayed device to a next device,
   when the rotation speed of the scroll knob, which has been received by the display switch unit, is faster than or equal to the predetermined value, the display switch unit sets a scan mode in which the display switch unit switches the displayed device continuously to following devices, and
   when predetermined time is elapsed without rotating the scroll knob in the scan mode, the display switch unit releases the scan mode.

2. The device information display apparatus according to claim 1, wherein
   when the manipulation unit transmits the instruction signal indicating a reverse direction of a current manipulation while the display switch unit switches the device continuously, the display switch unit stops a switching operation of the device.

3. The device information display apparatus according to claim 1, wherein
   the display unit displays graphically an order of the devices of which the device information is to be displayed.

4. The device information display apparatus according to claim 1, wherein
   the predetermined order is defined to cause a number showing the order to correspond to each device by a computer including a configuration tool.

5. The device information display apparatus according to claim 1, wherein
   the display unit is arranged at a front of the device information display apparatus, and a scroll knob is included on a right surface of the device information display apparatus.

6. A device information display apparatus comprising:
   field devices that are connected to a field bus;
   a device information reception unit that is connected to the field bus, the device information reception unit acquiring device information of the field devices through the field bus;
   a display unit that displays the device information, which has been acquired by the device information reception unit, on a screen;

a display switch unit that switches the field devices of which the display unit displays the device information, switching of the field devices being performed according to a predetermined order; and a manipulation unit that comprises a scroll knob that is rotatable to be manipulated, the manipulation unit transmitting an instruction signal depending on a rotation speed and rotation direction of the scroll knob to the display switch unit, wherein the display switch unit receives the instruction signal and switches the field devices in one of a forward direction and a reverse direction of the predetermined order based on the rotation direction of the scroll knob, which has been received by the manipulation unit, and wherein when the rotation speed of the scroll knob, which has been received by display switch unit, is slower than a predetermined value, the display switch unit switches a displayed device to a next device, when the rotation speed of the scroll knob, which has been received by display switch unit, is faster than or equal to the predetermined value, the display switch unit sets a scan mode in which the display switch unit switches the displayed device continuously to following devices, and when predetermined time is elapsed without rotating the scroll knob in the scan mode, the display switch unit releases the scan mode.

7. The device information display apparatus according to claim 6, wherein when the manipulation unit transmits the instruction signal indicating a reverse direction of a current manipulation while the display switch unit switches the field device continuously, the display switch unit stops a switching operation of the field device.

8. The device information display apparatus according to claim 6, wherein the display unit displays graphically an order of the field devices of which the device information is to be displayed.

9. The device information display apparatus according to claim 6, wherein the predetermined order is defined to cause a number showing the order to correspond to each field device by a computer including a configuration tool.

10. The device information display apparatus according to claim 6, wherein the display unit is arranged at a front of the device information display apparatus, and a scroll knob is included on a right surface of the device information display apparatus.

11. A device information display method comprising:

acquiring device information of devices through a field bus, the devices being connected to the field bus;

displaying the device information, which has been acquired, on a screen;

switching the devices of which the device information is displayed, switching of the devices being performed according to a predetermined order; and transmitting an instruction signal depending on rotation speed and rotation direction of a scroll knob, wherein switching of the devices is performed in one of a forward direction and a reverse direction of the predetermined order based on the rotation direction of the scroll knob , which has been received, and wherein when the rotation speed of the scroll knob, which has been transmitted, is slower than a predetermined value, a displayed device is switched to a next device, when the rotation speed of the scroll knob, which has been transmitted, is faster than or equal to the predetermined value, a scan mode in which the displayed device is switched continuously to following devices is set, and when predetermined time is elapsed without rotating the scroll knob in the scan mode, the scan mode is released.

12. The device information display method according to claim 11, wherein when the instruction signal indicating a reverse direction of a current manipulation is transmitted while the device is switched continuously, a switching operation of the device is stopped.

13. The device information display method according to claim 11, wherein an order of the devices of which the device information is to be displayed is displayed graphically.

14. The device information display method according to claim 11, wherein the predetermined order is defined to cause a number showing the order to correspond to each device by a computer including a configuration tool.

* * * * *